United States Patent
Li et al.

(10) Patent No.: US 11,796,194 B2
(45) Date of Patent: Oct. 24, 2023

(54) CONTROL PARAMETER DETERMINING METHOD AND APPARATUS, AND CONTROL SYSTEM FOR PHOTOVOLTAIC AIR CONDITIONING SYSTEM

(71) Applicant: Gree Electric Appliances, Inc. of Zhuhai, Guangdong (CN)

(72) Inventors: Jianhua Li, Guangdong (CN); Hewei Lou, Guangdong (CN); Keqin Liu, Guangdong (CN); Weitao Ni, Guangdong (CN); Jing Wang, Guangdong (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 376 days.

(21) Appl. No.: 16/327,164

(22) PCT Filed: Apr. 18, 2017

(86) PCT No.: PCT/CN2017/080871
§ 371 (c)(1),
(2) Date: Feb. 21, 2019

(87) PCT Pub. No.: WO2018/054045
PCT Pub. Date: Mar. 29, 2018

(65) Prior Publication Data
US 2019/0219286 A1    Jul. 18, 2019

(30) Foreign Application Priority Data
Sep. 21, 2016 (CN) .......................... 201610838835.3

(51) Int. Cl.
F24F 5/00        (2006.01)
F24F 11/64       (2018.01)
(Continued)

(52) U.S. Cl.
CPC ............. *F24F 5/0046* (2013.01); *F24F 11/46* (2018.01); *F24F 11/62* (2018.01); *F24F 11/63* (2018.01);
(Continued)

(58) Field of Classification Search
CPC ........ F24F 5/63; F24F 5/64; F24F 2005/0064; F24F 2140/60
See application file for complete search history.

(56) References Cited

U.S. PATENT DOCUMENTS

2016/0233683 A1\* 8/2016 Newcomb ................. H02J 3/40
2019/0219286 A1    7/2019 Li et al.

FOREIGN PATENT DOCUMENTS

CN        102664421        9/2012
CN        102856925        1/2013
(Continued)

OTHER PUBLICATIONS

Office Action for Canadian Application No. 3,034,759 dated Feb. 24, 2020 (5 pages).

*Primary Examiner* — Jerry-Daryl Fletcher
*Assistant Examiner* — Daniel C Comings
(74) *Attorney, Agent, or Firm* — J. Miguel Hernandez; James R. Gourley; Carstens, Allen & Gourley, LLP

(57) ABSTRACT

Disclosed is a control parameter determining method for a photovoltaic air conditioning system, specifically including: determining a real-time inductance parameter of a controlled object of the photovoltaic air conditioning system according to real-time grid-connected power of the photovoltaic air conditioning system; substituting the real-time inductance parameter into the controlled object of the control system to calculate a basic control parameter of the control system; presetting a plurality of adjustment parameters corresponding to different grid-connected power respectively; when the
(Continued)

real-time grid-connected power is matched with one of the grid-connected power, selecting an adjustment parameter corresponding to the matched grid-connected power to modify the basic control parameter, to obtain a target control parameter. The present disclosure further disclosed a control parameter determining apparatus and a control system for a photovoltaic air conditioning system.

3 Claims, 4 Drawing Sheets

(51) Int. Cl.
    *F24F 11/46*    (2018.01)
    *F24F 11/63*    (2018.01)
    *F24F 11/62*    (2018.01)
    *F24F 140/60*    (2018.01)

(52) U.S. Cl.
    CPC ....... *F24F 11/64* (2018.01); *F24F 2005/0064* (2013.01); *F24F 2005/0067* (2013.01); *F24F 2140/60* (2018.01)

(56) References Cited

FOREIGN PATENT DOCUMENTS

| | | | |
|---|---|---|---|
| CN | 103018575 | | 4/2013 |
| CN | 104158417 | | 11/2014 |
| CN | 104158417 A | * | 11/2014 ............. Y02E 10/56 |
| CN | 104319814 | | 1/2015 |
| CN | 104713176 | | 6/2015 |
| CN | 104776569 | | 7/2015 |
| CN | 104850166 | | 8/2015 |
| CN | 104979840 A | * | 10/2015 |
| CN | 105373012 | | 3/2016 |
| CN | 105387569 | | 3/2016 |
| CN | 106403182 | | 2/2017 |
| JP | 2002203729 | | 7/2002 |
| JP | 2015060929 | | 3/2015 |
| WO | 2018054045 A1 | | 3/2018 |

* cited by examiner

CONTROL PARAMETER DETERMINING METHOD AND APPARATUS, AND CONTROL SYSTEM FOR PHOTOVOLTAIC AIR CONDITIONING SYSTEM

TECHNICAL FIELD

This application claims the benefit of the priority of Chinese Patent Application No. 201610838835.3, filed on Sep. 21, 2016, entitled "CONTROL PARAMETER DETERMINING METHOD AND DEVICE, AND CONTROL SYSTEM FOR PHOTOVOLTAIC AIR CONDITIONING SYSTEM", and the entire content of which is incorporated therein by reference.

BACKGROUND

The photovoltaic air conditioning system, as a green energy-saving household appliance that integrates electricity generation and consumption, is welcomed by the people. In order to ensure the normal operation of the photovoltaic air conditioning system, on the basis of meeting requirements of its electricity consumption standards, it is also required that the photovoltaic air conditioning system can be connected to the grid for electricity generation in a flexible and user friendly manner. At present, what is applied to the photovoltaic air conditioning system is the proportional integral control scheme based on the classical control theory, the technical solution is simple and reliable, and is very suitable for product development.

However, the proportional integral control parameters required by the control system based on the classical control theory heavily depend on the construction of the mathematical model of the controlled object, i.e., the proportional integral control parameters are fixed parameters obtained by calculating according to a pre-constructed mathematical model of the controlled object, without being able to change with the external environment. But in the practical application, the external parameters of the photovoltaic air conditioning system are complex and variable, for example, the weather, compressor load and grid-connected inductance may be randomly changed, and any of these random changes may seriously affect the photovoltaic air conditioning system which is an integration device of electricity generation and consumption. The control system with fixed parameters is seriously unstable in control effect when suffering from the above affects, and cannot meet the control requirements of electricity generation and consumption.

SUMMARY

In view of this, the present disclosure provides an information delivery method and apparatus, with the purpose of solving a technical problem that the current information delivery method between an electronic device and a user displays poor security.

The above-mentioned objective is accomplished with the following technical solutions.

A control parameter determining method for a photovoltaic air conditioning system is provided, the control parameter determining method is applied to a control system of the photovoltaic air conditioning system and includes:

determining a real-time inductance parameter of a controlled object of the control system according to real-time grid-connected power of the photovoltaic air conditioning system;

substituting the real-time inductance parameter into the controlled object of the control system to calculate a basic control parameter of the control system;

presetting a plurality of adjustment parameters corresponding to different grid-connected power ranges respectively;

when the real-time grid-connected power is matched with one of the grid-connected power ranges, selecting an adjustment parameter corresponding to the matched grid-connected power range to modify the basic control parameter to obtain a target control parameter.

Optionally, the determining the real-time inductance parameter of the controlled object of the control system according to the real-time grid-connected power of the photovoltaic air conditioning system includes:

acquiring real-time grid-connected power of the photovoltaic air conditioning system;

calculating a real-time grid-connected current of the photovoltaic air conditioning system according to the real-time grid-connected power;

determining the real-time inductance parameter according to the real-time grid-connected current.

Optionally, the determining the real-time inductance parameter according to the real-time grid-connected current includes:

determining the real-time inductance parameter from an inductance current relation curve of a reactor in the controlled object according to the real-time grid-connected current.

A control parameter determining apparatus for a photovoltaic air conditioning system is provided, the control parameter determining apparatus is applied to a control system of the photovoltaic air conditioning system and includes:

an inductance parameter determining module, configured to determine a real-time inductance parameter of a controlled object of the control system according to real-time grid-connected power of the photovoltaic air conditioning system;

a basic parameter calculating module, configured to substitute the real-time inductance parameter into the controlled object of the control system to calculate a basic control parameter of the control system;

an adjustment parameter presetting module, configured to preset a plurality of adjustment parameters corresponding to different grid-connected power ranges respectively;

a target parameter calculating module, configured to, when the real-time grid-connected power is matched with one of the grid-connected power ranges, select an adjustment parameter corresponding to the matched grid-connected power range to adjust the control parameter, to obtain a target control parameter.

Optionally, the inductance parameter determining module includes:

a grid-connected power acquiring unit, configured to acquire real-time grid-connected power of the photovoltaic air conditioning system;

a grid-connected current calculating unit, configured to calculate a real-time grid-connected current of the air conditioning system according to the real-time grid-connected power;

an inductance parameter calculating unit, configured to determine the real-time inductance parameter according to the real-time grid-connected current.

Optionally, the inductance parameter calculating unit is configured to determine the real-time inductance parameter from an inductance current relation curve of a reactor in the controlled object according to the real-time grid-connected current.

A control system for a photovoltaic air conditioning system including a control parameter determining apparatus is provided; the control parameter determining apparatus includes an inductance parameter determining module, a basic parameter calculating module, an adjustment parameter presetting module and a target parameter calculating module; the inductance parameter determining module is configured to determine a real-time inductance parameter of a controlled object of the control system according to real-time grid-connected power of the photovoltaic air conditioning system; the basic parameter calculating module is configured to substitute the real-time inductance parameter into the controlled object of the control system to calculate a basic control parameter of the control system; the adjustment parameter presetting module is configured to preset a plurality of adjustment parameters corresponding to different grid-connected power ranges respectively; the target parameter calculating module is configured to, when the real-time grid-connected power is matched with one of the grid-connected power ranges, select an adjustment parameter corresponding to the matched grid-connected power range to adjust the control parameter to obtain a target control parameter; the control parameter determining apparatus further includes:

a grid-connected power receiving end, configured to receive the real-time grid-connected power;

a preset parameter receiving end, configured to receive a plurality of the adjustment parameters input by a user;

a control parameter transmitting end, configured to connect to a proportional integral control unit of the controlled object of the control system and transmit the target control parameter to the proportional integral control unit.

Optionally, the inductance parameter determining module includes:

a grid-connected power acquiring unit, configured to acquire real-time grid-connected power of the photovoltaic air conditioning system;

a grid-connected current calculating unit, configured to calculate a real-time grid-connected current of the photovoltaic air conditioning system according to the real-time grid-connected power;

an inductance parameter calculating unit, configured to determine the real-time inductance parameter according to the real-time grid-connected current.

Optionally, the inductance parameter calculating unit is configured to determine the real-time inductance parameter from an inductance current relation curve of a reactor in the controlled object according to the real-time grid-connected current.

The present disclosure provides a control parameter determining method, a control parameter determining apparatus, and a control system for a photovoltaic air conditioning system. The method and apparatus are applied to the control system of the photovoltaic air conditioning system, for determining a target control parameter applied to the control system, specifically including: determining a real-time inductance parameter of a controlled object of a control system of the photovoltaic air conditioning system according to real-time grid-connected power of the photovoltaic air conditioning system; substituting the real-time inductance parameter into the controlled object of the control system to calculate a basic control parameter of the control system; presetting a plurality of adjustment parameters corresponding to different grid-connected power ranges respectively; when the real-time grid-connected power is matched with one of the grid-connected power ranges, selecting an adjustment parameter corresponding to the matched grid-connected power range to modify the basic control parameter, to obtain a target control parameter. Since the determined target control parameter of the present disclosure is not a fixed control parameter, but a dynamic control parameter of the different grid-connected power determined according to a different grid-connected power, and the different grid-connected power depends on the variation of the external parameters, thus the target control parameter herein is capable of adapting to the variation of the external parameters, so as to be able to solve the technical problem that the current photovoltaic air conditioning system cannot meet the control requirements of electricity generation and consumption when the external parameters are varying.

BRIEF DESCRIPTION OF DRAWINGS

In order to detail the embodiments of the present invention or the technical solution of the prior art, the accompanying drawings required to illustrate embodiments or the prior art are introduced as follows. Obviously, the accompanying drawings described below are only some embodiments, and it is possible for those skilled in the art to obtain other accompanying drawings according to these accompanying drawings without any creative work.

DETAILED DESCRIPTION OF DISCLOSED EMBODIMENTS

The technical schemes of embodiments of the present invention will be clearly and completely described in conjunction with the accompanying drawings as follows. Obviously, the described embodiments are just a part, not all of the embodiments of the present invention. Based on the embodiments of the present invention, all other embodiments obtained by those skilled in the art without any creative work are also in the scope of the present disclosure.

Embodiment One

Figure 1:
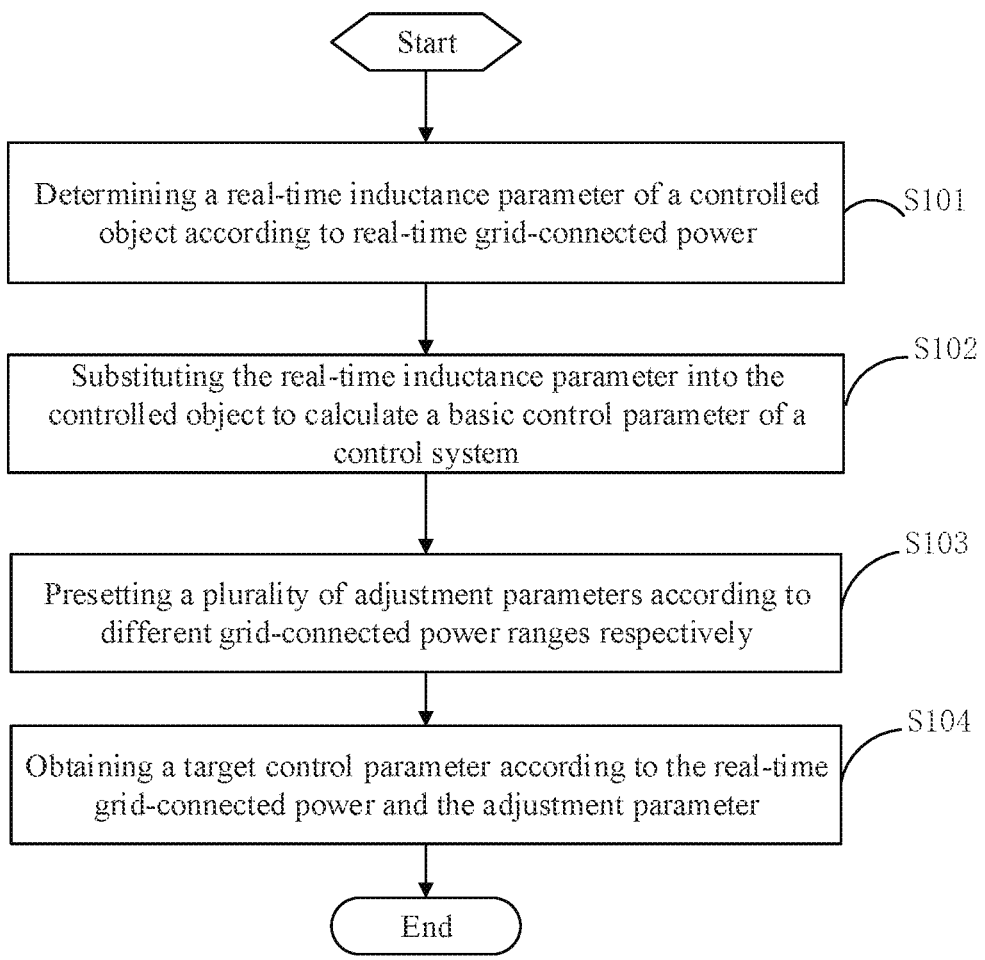
FIG. 1 is a flow chart of a control parameter determining method for a photovoltaic air conditioning system according to an embodiment of the present invention.

FIG. 1 is a flow chart of a control parameter determining method for a photovoltaic air conditioning system provided by the present disclosure.

As shown in FIG. 1, the control parameter determining method provided by the disclosure is applied to a control system of the photovoltaic air conditioning system to determine a target control parameter. The target control parameter is used as a proportional integral control parameter of a proportional integral control unit of the control system. The control parameter determining method specifically includes the following steps.

At S101, a real-time inductance parameter of a controlled object is determined according to real-time grid-connected power.

Here the real-time grid-connected power refers to exchange power of the photovoltaic air conditioning system and the power grid, specifically refers to electricity generation power when the photovoltaic air conditioning system is generating electricity, or electricity consumption power when the photovoltaic air conditioning system is using electricity. The real-time inductance parameter is adopted because the inductance of the controlled object of the control system will be changed with the current, which is the innovation of the present disclosure. The specific steps of acquiring the real-time inductance parameter by means of the grid-connected power are given as follows.

Firstly, the real-time grid-connected power of the photovoltaic air conditioning system, i.e., the grid-connected power at the current moment, is acquired. The grid-connected power depends on the grid-connected current and the grid-connected voltage, and the grid-connected voltage depends on the voltage of the power grid to which the photovoltaic air conditioning system is connected.

Then based on the above analysis, the real-time grid-connected current is calculated according to the real-time grid-connected power, and the real-time grid-connected current equals to the real-time grid-connected power divided by the current grid-connected voltage.

Finally, the inductance parameter of the controlled object of the control system, specifically a real-time inductance parameter of a reactor disposed within the controlled object, is determined according to an inductance current relation curve and the real-time grid-connected current. The curve is $L=a*I$, wherein L is the real-time inductance parameter, a is an inductance current coefficient of the reactor, and I is the real-time grid-connected current.

At S102, the real-time inductance parameter is substituted into the controlled object to calculate a basic control parameter of the control system.

The essence is to take the real-time inductance parameter as a dynamic parameter instead of the original fixed parameter of the controlled object, and calculate the current basic control parameter of the controlled object according to the mathematical model including the dynamic parameter of the controlled object. The method of calculating the basic control parameter is the same with that of calculating the control parameter according to a fixed mathematical model currently, no longer repeated here.

For example, it is possible to substitute $2*pi*f*L$ into the controlled object so as to obtain the basic proportional integral control parameters $Kp=1.05$ and $Ki=0.4$; wherein pi is 3.1415926; f is the grid-connected power, i.e., the real-time frequency of the power grid, typically 50 Hz; and L is the above-mentioned real-time inductance parameter.

At S103, a plurality of adjustment parameters corresponding to different grid-connected power ranges respectively, are preset.

There may be a plurality of adjustment parameters corresponding to different grid-connected power ranges respectively, to adjust the basic control parameter for different real-time grid-connected power.

For example, in this embodiment the adjustment parameter k1 is selected to be 1 when the grid-connected power range is 0~4000 W; the adjustment parameter k2 is selected to be 0.8 when the grid-connected range is 4000 W~6500 W; the adjustment parameter k3 is selected to be 0.7 when the grid-connected power range is 6500 W~9500 W; and the adjustment parameter k4 is selected to be 0.5 when the grid-connected power range goes beyond 9500 W.

At S104, the target control parameter is obtained according to the real-time grid-connected power and the adjustment parameter.

Specifically, when the real-time grid-connected power is matched with one of the above-mentioned multiple grid-connected power ranges, the adjustment parameter corresponding to the matched grid-connected power range is utilized to adjust the above-mentioned basic control parameter, so as to obtain the target control parameter.

For example, when the real-time grid-connected power is 5500 W, the grid-connected power range matched with the real-time grid-connected power is 4000 W~6500 W, at this moment the adjustment parameter $k2=0.8$ is selected. Then the adjustment parameter k2 is used to modify the basic control parameter so as to obtain the target control parameter, in other words, the target proportional integral control parameter. Since the division relationship is existed between Kp and Ki, thus the adjustment parameter is utilized alone to modify the proportional parameter Kp, so as to obtain a target proportional control parameter Kp' and a target integral control parameter Ki', wherein Ki=Ki'.

It can be seen from the above technical solution that, the embodiment provides a control parameter determining method for a photovoltaic air conditioning system. The method is applied to the control system of the photovoltaic air conditioning system, for determining the target control parameter applied to the control system. Specifically, a real-time inductance parameter of a controlled object of the photovoltaic air conditioning system is determined according to real-time grid-connected power of the photovoltaic air conditioning system; the real-time inductance parameter is substituted into the controlled object of the control system to calculate a basic control parameter of the control system; a plurality of adjustment parameters corresponding to different grid-connected power ranges respectively are preset; when the real-time grid-connected power is matched with one of the grid-connected power ranges, the adjustment parameter corresponding to the matched grid-connected power range is selected to modify the basic control parameter, to obtain the target control parameter. Since the determined target control parameter of the present disclosure is not a fixed control parameter, but a dynamic control parameter of a different grid-connected power determined according to the different grid-connected powers, and the different grid-connected power depends on the variation of the external parameters, thus the target control parameter here is capable of adapting to the variation of the external parameters, so as to solve the problem that the current photovoltaic air conditioning system cannot meet the control requirements of electricity generation and consumption when the external parameters are varying.

Embodiment Two

Figure 2:
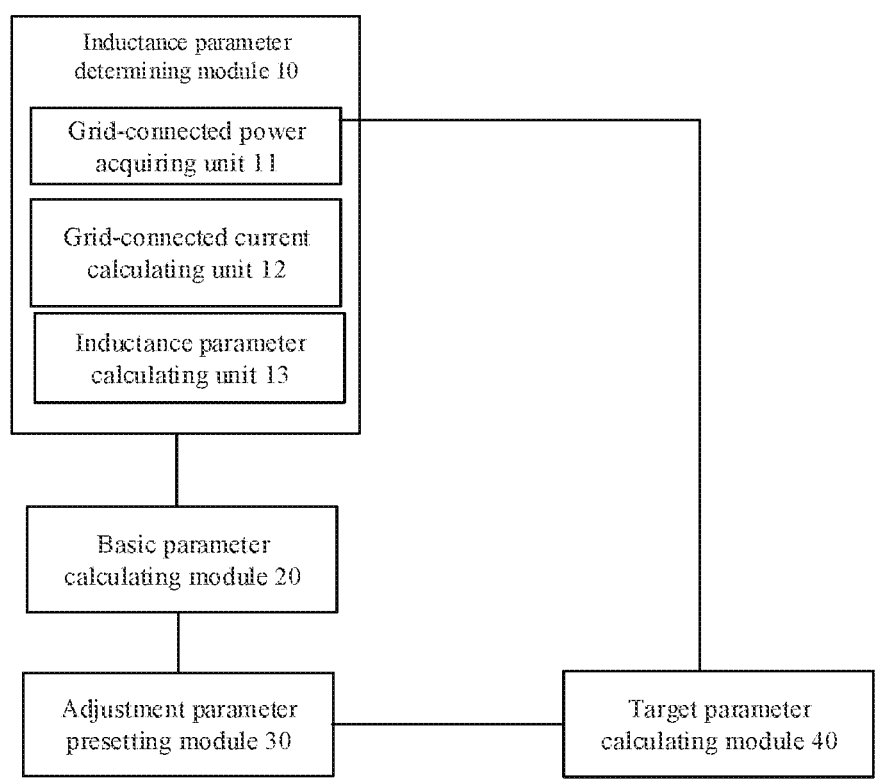
FIG. 2 is a structural diagram of a control parameter determining apparatus for a photovoltaic air conditioning system according to an embodiment of the present invention.

FIG. 2 is a structural diagram of a control parameter determining apparatus for a photovoltaic air conditioning system of the present disclosure.

As shown in FIG. 2, the control parameter determining apparatus provided by the embodiment is applied to a control system of the photovoltaic air conditioning system to determine a target control parameter which is used as the proportional integral control parameter of the proportional integral control unit of the control system. Such control parameter determining apparatus specifically includes an inductance parameter determining module 10, a basic parameter calculating module 10, an adjustment parameter presetting module 30 and a target parameter calculating module 40.

The inductance parameter calculating module 10 is configured to determine a real-time inductance parameter of a controlled object according to a real-time grid-connected power.

Here the real-time grid-connected power refers to an exchange power of the photovoltaic air conditioning system and the power grid, specifically refers to an electricity generation power when the photovoltaic air conditioning system is generating electricity or an electricity consumption power when the photovoltaic air conditioning system is using electricity. Here the real-time inductance parameter is adopted because the inductance of the controlled object of the control system will be changed with the current, and this is also the innovation of the present disclosure. Here, the inductance parameter calculating module 10 includes a grid-connected power acquiring unit 11, a grid-connected current calculating unit 12 and an inductance parameter calculating unit 13.

The grid-connected power acquiring unit 11 is configured to acquire the real-time grid-connected power of the photovoltaic air conditioning system, i.e., the grid-connected power at the current moment. The grid-connected power depends on the grid-connected current and the grid-connected voltage, wherein the grid-connected voltage depends on the voltage of the power grid to which the photovoltaic air conditioning system is connected.

Then based on the above analysis, the grid-connected current calculating unit 12 calculates the real-time grid-connected current according to the real-time grid-connected power acquired by the grid-connected power acquiring unit 11, and the real-time grid-connected current equals to the real-time grid-connected power divided by the current grid-connected voltage.

Finally, the inductance parameter calculating unit 13 determines the inductance parameter of the controlled object of the control system, specifically a real-time inductance parameter of a reactor disposed within the controlled object, according to an inductance current relation curve and the real-time grid-connected current. The relation curve is $L=a*I$, wherein L is the real-time inductance parameter, a is an inductance current coefficient of the reactor, and I is the real-time grid-connected current.

The basic parameter calculating module 20 is configured to substitute the real-time inductance parameter into the controlled object to calculate a basic control parameter of the control system.

Here, the essence is to take the real-time inductance parameter as a dynamic parameter instead of the original fixed parameter of the controlled object, and calculate the current basic control parameter of the controlled object according to a mathematical model of the controlled object including the dynamic parameter. The process of calculating the basic control parameter is the same with that of calculating the control parameter according to a fixed mathematical model currently, no longer repeated here.

For example, it is possible to substitute $2*pi*f*L$ into the controlled object to obtain the basic proportional integral control parameters $Kp=1.05$ and $Ki=0.4$; wherein pi is 3.1415926; f is the grid-connected power, i.e., a real-time frequency of the power grid, typically 50 Hz; and L is the real-time inductance parameter.

The adjustment parameter presetting module 30 is configured to preset a plurality of adjustment parameters corresponding to different grid-connected power ranges respectively according to commands set by a user.

There may be a plurality of adjustment parameters corresponding to different grid-connected power ranges respectively, to adjust the basic control parameter for a different real-time grid-connected power.

For example, in this embodiment the adjustment parameter k1 is selected to be 1 when the grid-connected power range is 0~4000 W; the adjustment parameter k2 is selected to be 0.8 when the grid-connected power range is 4000 W~6500 W; the adjustment parameter k3 is selected to be 0.7 when the grid-connected power range is 6500 W~9500 W; and the adjustment parameter k4 is selected to be 0.5 when the grid-connected power range goes beyond 9500 W.

The target parameter calculating module 40 obtains the target control parameter according to the real-time grid-connected power and the adjustment parameter.

Specifically, when the real-time grid-connected power is matched with one of the above-mentioned multiple grid-connected power ranges, the adjustment parameter corresponding to the matched grid-connected power range is utilized to adjust the above-mentioned basic control parameter, so as to obtain the target control parameter.

For example, when the real-time grid-connected power is 5500 W, the grid-connected power range matched with the real-time grid-connected power is 4000 W~6500 W, at this moment the adjustment parameter k2=0.8 is selected. Then the adjustment parameter k2 is utilized to modify the basic control parameter so as to obtain the target control parameter, in other words, the target proportional integral control parameter. Since the division relationship is existed between Kp and Ki, thus the adjustment parameter is utilized alone to modify the proportional parameter Kp, so as to obtain a target proportional control parameter Kp' and a target integral control parameter Ki', wherein Ki=Ki'.

It can be seen from the above technical solution that, the embodiment provides a control parameter determining apparatus for a photovoltaic air conditioning system. The apparatus is applied to the control system of the photovoltaic air conditioning system, for determining the target control parameter applied to the control system. Specifically, a real-time inductance parameter of a controlled object of the photovoltaic air conditioning system is determined according to real-time grid-connected power of the photovoltaic air conditioning system; the real-time inductance parameter is substituted into the controlled object of the control system to calculate a basic control parameter of the control system; a plurality of adjustment parameters corresponding to different grid-connected power ranges respectively are preset; when the real-time grid-connected power is matched with one of the grid-connected power ranges, the adjustment parameter corresponding to the matched grid-connected power range is selected to modify the basic control parameter, to obtain the target control parameter. Since the determined target control parameter of the present disclosure is not a fixed control parameter, but a dynamic control parameter of a different grid-connected power determined according to the different grid-connected power, and the different grid-connected power depends on the variation of the external parameters, thus the target control parameter here is capable of adapting to the variation of the external parameters, so as to solve the problem that the current photovoltaic air conditioning system cannot meet the control requirements of electricity generation and consumption when the external parameters are varying.

Embodiment Three

Figure 3:
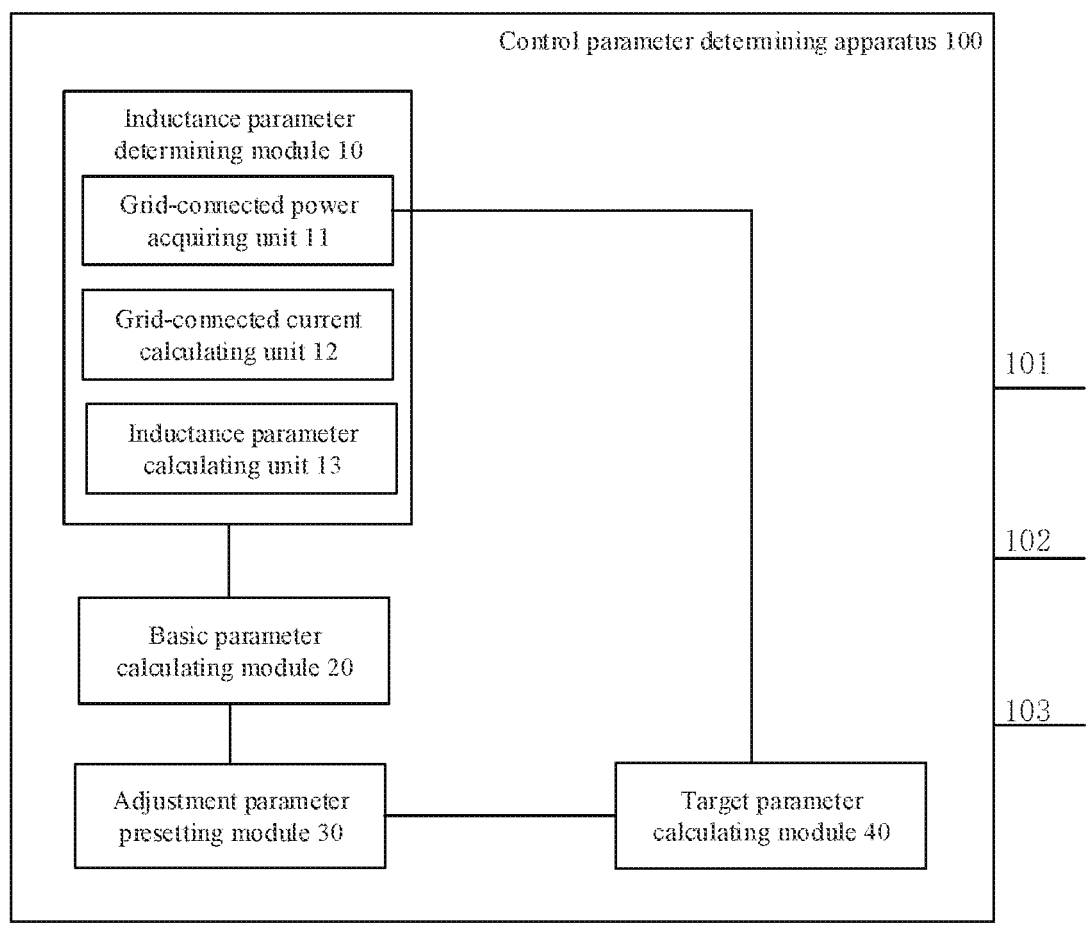
FIG. 3 is a structural diagram of a control system for a photovoltaic air conditioning system according to an embodiment of the present invention.
Figure 4:
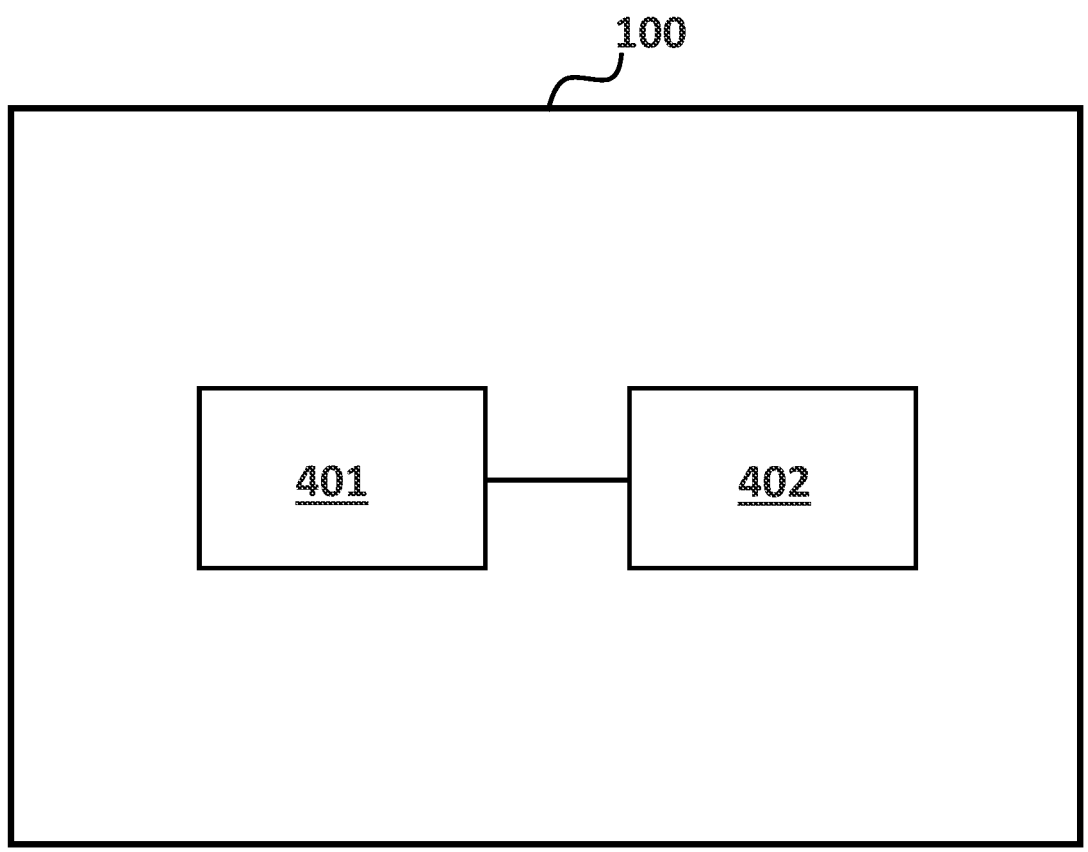
FIG. 4 is a schematic illustration of a control parameter determining apparatus comprising a processor and a memory.

FIG. 3 is a structure diagram of a control system for a photovoltaic air conditioning system according to an embodiment of the present invention.

As shown in FIG. 3, the control system provided by the embodiment is applied to control the operation of the photovoltaic air conditioning system. The control system includes a control parameter determining apparatus 100 for determining a target control parameter which is used as a proportional integral control parameter of the proportional integral control unit of the control system. Such control parameter determining apparatus specifically includes an inductance parameter determining module 10, a basic parameter calculating module 20, an adjustment parameter presetting module 30 and a target parameter calculating module 40.

The inductance parameter calculating module 10 is configured to determine a real-time inductance parameter of a controlled object according to real-time grid-connected power.

Here the real-time grid-connected power refers to an exchange power of the photovoltaic air conditioning system and the power grid, specifically refers to electricity generation power when the photovoltaic air conditioning system is generating electricity, or electricity consumption power when the photovoltaic air conditioning system is using electricity. Here the real-time inductance parameter is adopted because the inductance of the controlled object of the control system will be changed with the current, and this is also the innovation of the present disclosure. Here, the inductance parameter calculating module 10 includes a grid-connected power acquiring unit 11, a grid-connected current calculating unit 12 and an inductance parameter calculating unit 13.

The grid-connected power acquiring unit 11 is configured to acquire the real-time grid-connected power of the photovoltaic air conditioning system, i.e., the grid-connected power at the current moment. The grid-connected power depends on the grid-connected current and the grid-connected voltage, wherein the grid-connected voltage depends on the voltage of the power grid to which the photovoltaic air conditioning system is connected.

Then based on the above analysis, the grid-connected current calculating unit 12 calculates the real-time grid-connected current according to the real-time grid-connected power acquired by the grid-connected power acquiring unit 11, and the real-time grid-connected current equals to the real-time grid-connected power divided by the current grid-connected voltage.

Finally, the inductance parameter calculating unit 13 determines the inductance parameter of the controlled object of the control system, specifically a real-time inductance parameter of a reactor disposed within the controlled object, according to an inductance current relation curve and the real-time grid-connected current. The relation curve is $L=a*I$, wherein L is the real-time inductance parameter, a is an inductance current coefficient of the reactor, and I is the real-time grid-connected current.

The basic parameter calculating module 20 is configured to substitute the real-time inductance parameter into the controlled object to calculate a basic control parameter of the control system.

Here, the essence is to take the real-time inductance parameter as a dynamic parameter instead of the original fixed parameter of the controlled object, and calculate the current basic control parameter of the controlled object according to a mathematical model of the controlled object including the dynamic parameter. The process of calculating the basic control parameter is the same with that of calculating the control parameter according to a fixed mathematical model currently, no longer repeated here.

For example, it is possible to substitute $2*pi*f*L$ into the controlled object so as to obtain the basic proportional integral control parameters $Kp=1.05$ and $Ki=0.4$; wherein pi is 3.1415926; f is the grid-connected power, i.e., a real-time frequency of the power grid, typically 50 Hz; and L is the above-mentioned real-time inductance parameter.

The adjustment parameter presetting module 30 is configured to preset a plurality of adjustment parameters corresponding to different grid-connected power ranges respectively according to commands set by a user.

There may be a plurality of adjustment parameters corresponding to different grid-connected power ranges respectively, to adjust the basic control parameter for different real-time grid-connected power.

For example, in this embodiment the adjustment parameter $k1$ is selected to be 1 when the grid-connected power range is 0~4000 W; the adjustment parameter $k2$ is selected to be 0.8 when the grid-connected power range is 4000 W~6500 W; the adjustment parameter $k3$ is selected to be 0.7 when the grid-connected power range is 6500 W~9500 W; and the adjustment parameter $k4$ is selected to be 0.5 when the grid-connected power range goes beyond 9500 W.

The target parameter calculating module 40 obtains the target control parameter according to the real-time grid-connected power and the adjustment parameter.

Specifically, when the real-time grid-connected power is matched with one of the above-mentioned multiple grid-connected power ranges, the adjustment parameter corresponding to the matched grid-connected power range is utilized to adjust the above-mentioned basic control parameter, so as to obtain the target control parameter.

For example, when the real-time grid-connected power is 5500 W, the grid-connected power range matched with the real-time grid-connected power is 4000 W~6500 W, at this moment the adjustment parameter $k2=0.8$ is selected. Then the adjustment parameter k2 is utilized to modify the basic control parameter so as to obtain the target control parameter, in other words, the target proportional integral control parameter. Since a division relationship is existed between Kp and Ki, thus the adjustment parameter is utilized alone to modify the proportional parameter Kp, so as to obtain a target proportional control parameter Kp' and a target integral control parameter Ki', wherein Ki=Ki'.

In addition, the control parameter determining apparatus in the embodiment further includes a grid-connected power receiving end 101, a preset parameter receiving end 102 and a control parameter transmitting end 103.

The grid-connected power receiving end 101 is connected to a convertor device of the photovoltaic air conditioning system, for receiving real-time grid-connected power of the convertor device. The preset parameter receiving end 102 is configured to receive a plurality of adjustment parameters input by a user. The control parameter transmitting end 103 is configured to connect to the proportional integral control unit of the controlled object of the control system, and transmit the target control parameter to the proportional integral control unit.

It can be seen from the above technical solution that, the embodiment provides a control system for a photovoltaic air conditioning system. The control system includes a control parameter determining apparatus which is configured to determine a target control parameter applied to the control system. Specifically, a real-time inductance parameter of a controlled object of the photovoltaic air conditioning system is determined according to real-time grid-connected power of the photovoltaic air conditioning system; the real-time inductance parameter is substituted into the controlled object of the control system to calculate a basic control parameter of the control system; a plurality of adjustment parameters corresponding to different grid-connected power ranges respectively are preset; when the real-time grid-connected power is matched with one of the grid-connected power ranges, the adjustment parameter corresponding to the matched grid-connected power range is selected to modify the basic control parameter, to obtain the target control parameter. Since the determined target control parameter of the present disclosure is not a fixed control parameter, but a dynamic control parameter of different grid-connected power determined according to the different grid-connected power, and the different grid-connected power depends on the variation of the external parameters, thus the target control parameter here is capable of adapting to the variation of the external parameters, so as to solve the problem that the current photovoltaic air conditioning system cannot meet the control requirements of electricity generation and consumption when the external parameters are varying.

Embodiments in the description are illustrated in a progressive way. Each embodiment emphasizes differences from other embodiments, and the same or similar part of each embodiment can be seen from each other. The above description of embodiments of the disclosure can make those skilled in the art capable of implementing or using the present application. Various modifications of the embodiments are obvious for those skilled in the art. The general theory defined in this text can be implemented in other embodiments without departing from the spirit or scope of the present disclosure. Therefore, the present disclosure will not be limited to the embodiments illustrated in the text, but should conform to the broadest scope consistent with the principle and novelty of the present disclosure.

What is claimed is:

1. A controller for a photovoltaic air conditioner, comprising
a grid-connected power receiving port, a preset parameter receiving port, and a control parameter transmitting port, wherein the controller performs steps of:
the grid-connected power receiving port receiving a real-time grid-connected power;
determining a real-time inductance parameter of a controlled object of the controller according to the real-time grid-connected power of the photovoltaic air conditioner;
substituting the real-time inductance parameter into the controlled object of the controller to calculate a basic control parameter of the controller;
presenting a plurality of adjustment parameters corresponding to different grid-connected power ranges respectively;
the preset parameter receiving port receiving the plurality of the adjustment parameters inputted by a user;
when the real-time grid-connected power is matched with one of the grid-connected power ranges, selecting an adjustment parameter corresponding to the matched grid-connected power range to adjust the basic control parameter to obtain a target control parameter;
and
a control parameter transmitting port connecting to a proportional integral control assembly of the controlled object of the controller and transmitting the target control parameter to the proportional integral control assembly;
wherein the real-time inductance parameter is a dynamic parameter;
the substituting the real-time inductance parameter into the controlled object of the controller to calculate the basic control parameter of the controller comprises: calculating the basic control parameter of the controller according to a mathematical model including the dynamic parameter of the controlled object.

2. The controller for the photovoltaic air conditioner of claim 1, wherein, the determining the real-time inductance parameter of a controlled object of the controller according to the real-time grid-connected power of the photovoltaic air conditioner comprises:
acquiring the real-time grid-connected power of the photovoltaic air conditioner;
calculating a real-time grid-connected current of the photovoltaic air conditioner according to the real-time grid-connected power;
determining the real-time inductance parameter according to the real-time grid-connected current.

3. The controller for the photovoltaic air conditioner of claim 1, wherein, the determining the real-time inductance parameter according to the real-time grid-connected current comprises: determining the real-time inductance parameter from an inductance current relation curve of a reactor in the controlled object according to the real-time grid-connected current.

* * * * *